United States Patent [19]

Greve

[11] Patent Number: 4,487,268
[45] Date of Patent: Dec. 11, 1984

[54] LIFTING ATTACHMENTS FOR CULTIVATORS

[76] Inventor: Lester B. Greve, R.R. 1, Sabula, Iowa 52070

[21] Appl. No.: 462,351

[22] Filed: Jan. 31, 1983

[51] Int. Cl.³ .............................................. A01B 63/10
[52] U.S. Cl. .................................... 172/316; 172/488; 172/491; 172/502; 172/468
[58] Field of Search ............ 172/468, 661, 662, 624.5, 172/316, 463, 471, 488, 491, 505, 462, 452, 483, 484, 502; 111/52, 60, 92; 414/563

[56] References Cited

U.S. PATENT DOCUMENTS

| | | | |
|---|---|---|---|
| 2,164,254 | 6/1939 | Olson | 172/468 |
| 3,193,021 | 7/1965 | Lane | 172/60 |
| 3,433,310 | 3/1969 | Harper | 172/471 |
| 3,490,542 | 1/1970 | Eiten | 172/491 X |
| 3,593,865 | 7/1971 | Moor | 414/563 |
| 3,708,019 | 1/1973 | Ryan | 172/624.5 |
| 3,804,179 | 4/1974 | Johnson | 172/624.5 X |
| 4,333,534 | 6/1982 | Swanson | 172/483 |
| 4,396,069 | 8/1983 | Ferber | 172/310 |

Primary Examiner—Richard J. Johnson
Attorney, Agent, or Firm—Glenn H. Antrim

[57] ABSTRACT

Components suitable to be sold in kits can be readily applied to cultivators of different makes to be able to raise and to lower independently the ground-working tools on either side of the cultivators. A typical kit contains an upper supporting member, two crossbars, and fastening means for readily attaching the components to a typical cultivator of any make. After installation, the upper support extends upwardly and rearward from the front drawbar to provide a point of support above carriers of a cultivator that are to be ganged for lifting. A crossbar is connected to the rear portion of each of the carriers to be ganged, and then a hydraulic cylinder positioned substantially vertically is connected between each crossbar and the upper support.

1 Claim, 2 Drawing Figures

LIFTING ATTACHMENTS FOR CULTIVATORS

BACKGROUND OF THE INVENTION

This invention relates to those portions of cultivators for lifting any selected gangs of earth-working implements independent of the lifting of any other gangs, and particularly to universal attachments adaptable to different makes of cultivators for lifting gangs independently.

Conventionally, cultivators of moderate size for cultivating four to six rows at a time have provisions for raising or for lowering all earth-working tools simultaneously by a tractor hitch, or other lifting means, but do not have provisions for lifting either the right half or the left half of the tools independently. Therefore, these cultivators have limited utility along the sides of fields and particularly at slanted ends or point rows where only a portion of a multiple row cultivator is over planted rows and needs to be lowered.

Lifting mechanisms supplied with new cultivators are usually suitable for only cultivators of particular constructions as one example shown in U.S. Pat. No. 3,708,019 issued to Edward Clyde Ryan on Jan. 2, 1973. In that patent the type of pivotal means for connecting tool carriers for different rows to a common drawbar is respective pairs of links in a parallel arrangement. The independent lifting of tools depend upon a crossbar engaging one of the links of each carrier for each gang of tools to be lifted at a time. This prior arrangement could not be readily adapted to cultivators using different pivotal arrangements or merely having different dimensions for parts in similar arrangements.

SUMMARY OF THE INVENTION

The present lifting attachments are readily installed on cultivators of different makes to provide the feature of having the earth-working tools at either side of cultivators lowered while the working tools on the other side are raised from the ground. Since manufacturers often do not provide in medium size models for four to six rows, means to lift shovels at either side of a cultivator independently, lifting attachments to be easily installed by users are particularly needed for these sizes. Multiple-row cultivators of different manufactures are similar in that they have a forward drawbar to be connected to a three-point hitch of a tractor, a carrier bar for each row supporting an assembly of earth-working tools, and pivotal means between each of the carrier bars and the drawbar to permit the respective assemblies of earth-working tools to be either lowered or raised from the ground. The present lifting attachments are universally applicable to this general arrangement even though the pivotal means differ in structure, the dimensions of the carrier bars are different, and shovels are attached differently to the carrier bars. Original lifting devices on different makes may depend upon some of these structural differences and therefore not be applicable to other makes.

The attachment comprises mainly an upper support, a plurality of crossbars, fasteners for easily connecting these components, and also may include hydraulic cylinders. The upper support has a lower end for connection to a usual drawbar at the front of a cultivator; the support is shaped to extend upwardly and rearward to position an upper end over carrier bars of the cultivator. The crossbars are positioned across and connected to respective groups of carrier bars for lifting any of the groups or gangs independently of the others. In order to function as a support for hydraulic cylinders that are to be connected individually to the crossbars for lifting gangs of carriers independently, the upper support has vertical front portions of required length to accommodate substantially vertical positioning of the hydraulic cylinders to be connected between respective carrier bars and the rearward extending, upper end of the upper support. The cylinders are connected in a usual manner to separate hydraulic controls.

DESCRIPTION OF THE PREFERRED EMBODIMENT

Figure 1:
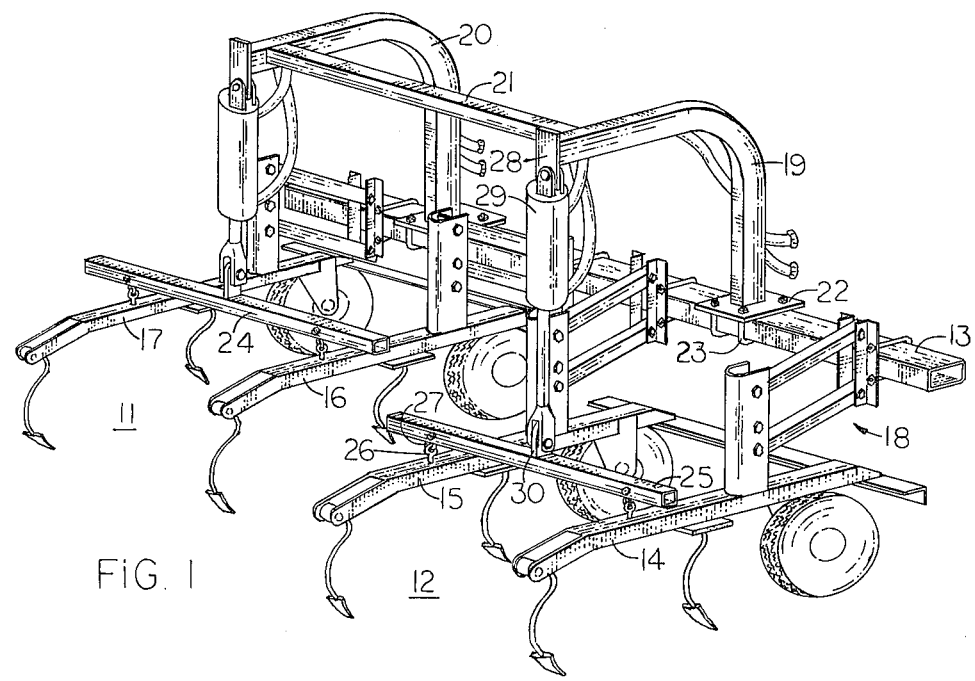
FIG. 1 is a rear perspective view of a four-row cultivator on which a lifting attachment of this invention has been installed.

The four-row cultivator shown in FIG. 1 has a left gang 11, shown raised, for two rows and a right gang 12, shown lowered, for an additional two rows. The cultivator has a conventional forward drawbar 13 behind which are pivotally attached carrier bars 14–17 to which are mounted in any conventional manner shovels for the respective rows. The front portions of each of the carrier bars 14–17 are connected by conventional pivotal means 18, such as parallel bars as shown, to the drawbar 13. The drawbar 13 and the front ends of the carrier bars 14–17 are supported in a usual manner by caster wheels.

An upper support having a lower end connected to the drawbar 13 comprises upwardly and rearward extending members 19 and 20 and a cross member 21 for rigidity connected between the upper ends of the members 19 and 20. The members 19 and 20 may each comprise a vertical piece of tubing and a horizontal piece of tubing having ends welded together at right angles, but a preferred member is fabricated from a single piece of tubing that has a gradually curved bend intermediate its ends. Tubing having dimensions of 2 inches by 4 inches (50.8 mm by 101.6 mm) is satisfactory for four-row cultivators, and 3 inches by 6 inches (762 mm by 152.4 mm) for six-row cultivators. In a typical installation, a member 19 or 20 extends upwardly 32 inches (8.13 m) and extends rearward 31 inches (7.87 m). The lower ends of the members 19 and 20 are preferably welded to respective horizontal plates 22 that are connected to the upper surface of the drawbar 13 in a conventional manner by U-bolts 23. The upper members 19 and 20 are positioned along the drawbar 13 to be directly in front of midpoint of a gang of cultivator carriers, such as carriers 14 and 15.

Figure 2:
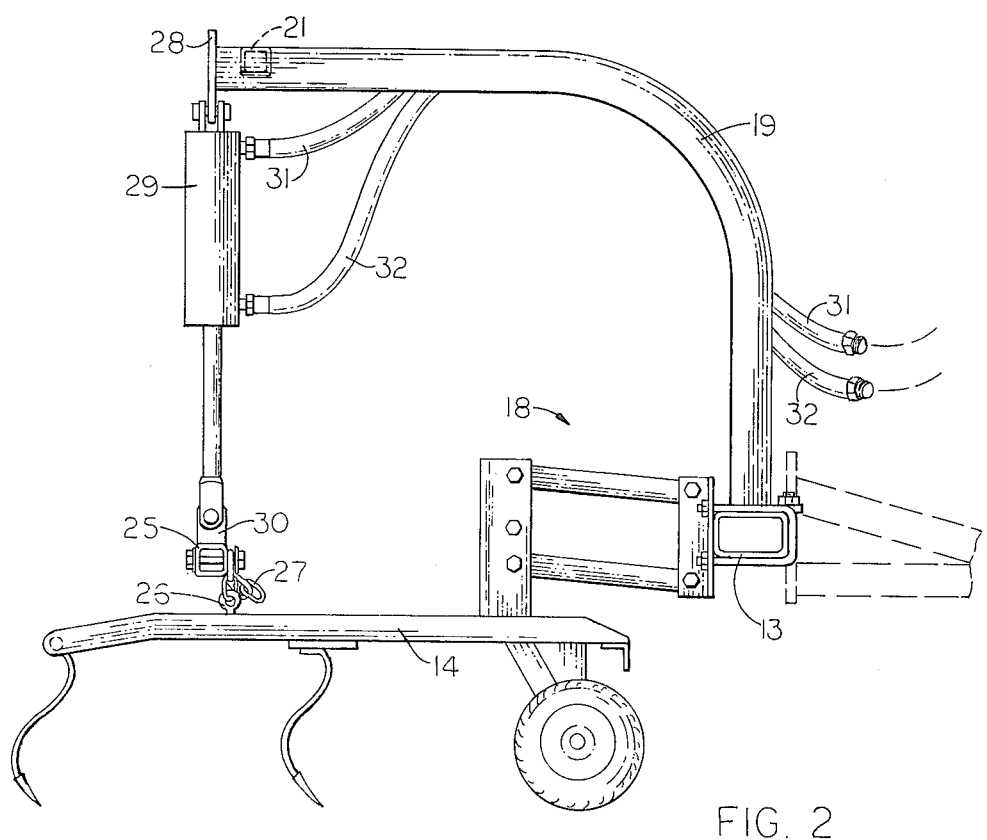
FIG. 2 is a side view of a portion for a single row of the cultivator of FIG. 1 and the respective portion of the lifting attachment.

Each of the crossbars 24 and 25 for the respective gangs 11 and 12 is typically 38 inches (9.65 m) long for ganging two rows of cultivating implements. For connecting the crossbar 25 to the carriers 14 and 15, an eye bolt 26 (FIG. 2) is inserted downwardly through each of the carriers at a point a substantial distance behind the pivotal means 18, and a selected one of a few links of a chain 27 secured to a respective crossbar 24 or 25 above each carrier 14–17, is connected through the eye of a respective eye bolt 26. The heights of the carriers 14–17 are determined by which links of respective chains 27 are connected to respective eye bolts 26.

A small mounting plate 28 is welded across the upper end of the upright member 19, and the cylinder of a hydraulic actuator 29 is attached in the usual manner by a bolt (FIG. 2) through a hole in the lower end of the plate. A lug 30 (FIG. 1) extends upwardly from the center of the crossbar 25, and the lower end of the rod of the cylinder 29 is connected by a bolt in a conventional manner through a hole in the lug. The cylinder 29 for the right gang of cultivating tools is connected by hydraulic hoses 31 and 32 to a hydraulic system through an individual valve (not shown) to provide usual double action, and likewise, the corresponding cylinder for the left gang is connected for individual operation.

Although cultivators of different makes differ in design, the relative placement of drawbars and carrier bars for the tools are sufficiently uniform for the present lifting attachment to be readily adapted. The dimensions of the upper support comprising members 19-21 can be varied as required, but generally an upper support of one size will be adaptable to most four-row cultivators and a support of similar dimensions except fabricated from larger tubing will be satisfactory for six-row cultivators. The length of the crossbar will be determined by the number of rows of implements that are to be ganged. Because of the uniform requirements, the relatively small number of different kits of parts will need to be stocked in order to supply attachments for different cultivators. Each kit will preferably include at least an upper support, two crossbars, and quick attachments means.

I claim:

1. A lift assembly for a cultivator, said cultivator being the type having a plurality of earth-working implements, each of said implements having a carrier bar and an earth-working tool assembly depending from said respective carrier bar, a forward drawbar to be hitched transversely to a tractor, pivotal means for each of said carrier bars, said carrier bars having respective front ends connected along spaced points to said drawbar by said respective pivotal means, said pivotal means permitting raising and lowering each of said earth-working tool assemblies individually, said earth-working implements to be arranged successively into a plurality of groups, said lift assembly comprising: a lifting crossbar for each of said groups, each of said lifting crossbars positioned crosswise said carrier bars of a respective one of said groups on a transverse line spaced rearward from said pivotal means, first fastening means connected together said crossbars and said carrier bars at each crossing thereof, an upper support, second fastening means rigidly connecting said upper support to said drawbar, said upper support extending upwardly from said drawbar and rearward over at least a portion of each of said crossbars, a hydraulic cylinder for each of said groups, each of said hydraulic cylinders having an upper end connected to said upper support and a lower end connected to a respective one of said crossbars, the distance between said upper support and each of said crossbars being sufficient to facilitate positioning said hydraulic cylinders substantially vertically, and said hydraulic cylinders being operable individually to raise and to lower selectively said respective carrier bars and said respective earth-working tool assemblies attached thereto.

* * * * *